W. A. SCHROEDER.
DIMMING DEVICE FOR HEADLIGHTS.
APPLICATION FILED JULY 14, 1919.
1,389,273.
Patented Aug. 30, 1921.
4 SHEETS—SHEET 1.
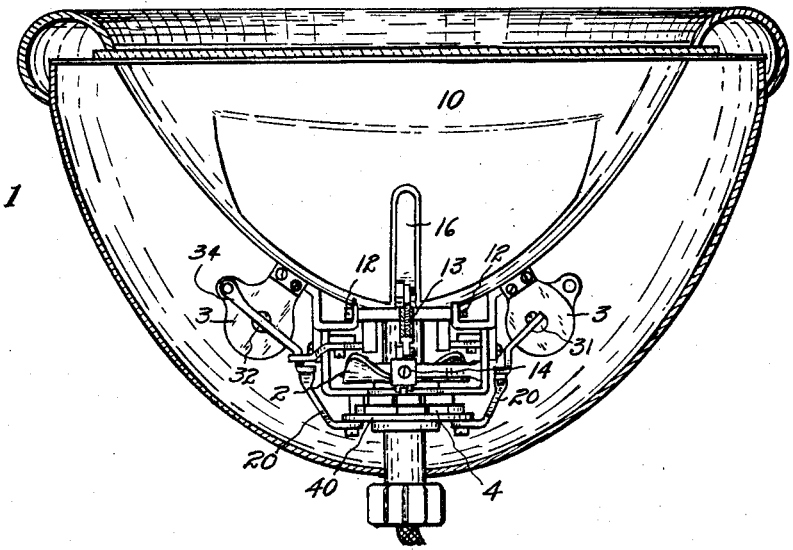
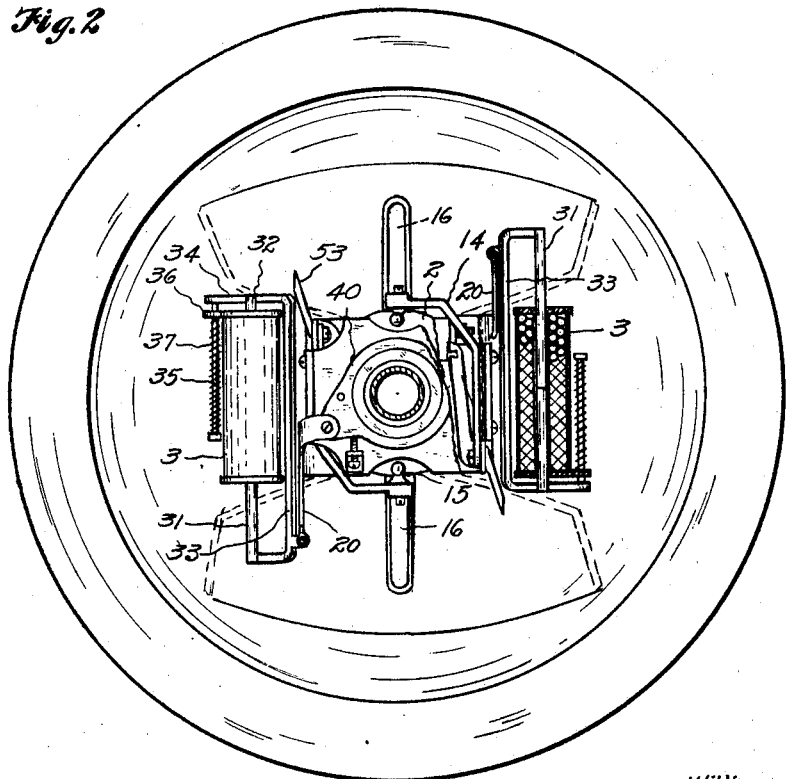
INVENTOR
William A. Schroeder.
BY
Reynolds & Cook
ATTORNEY

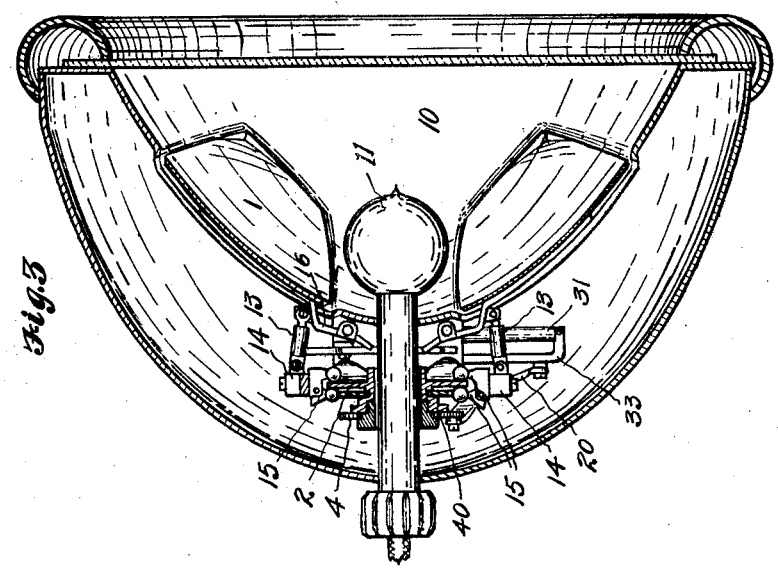
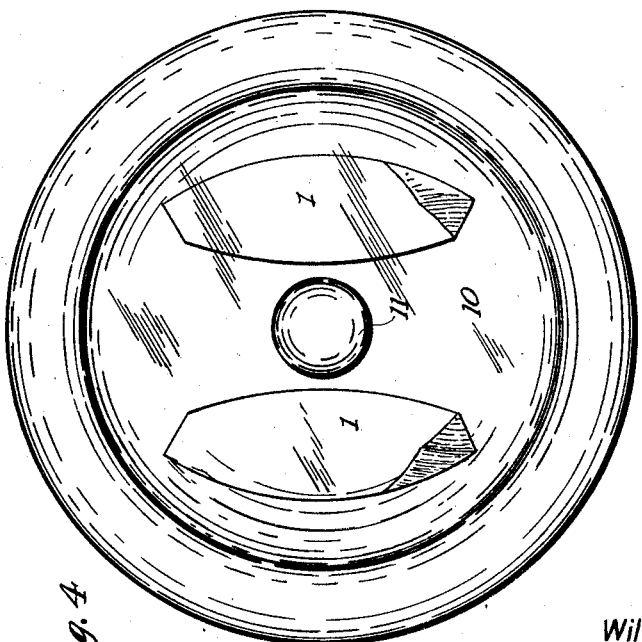

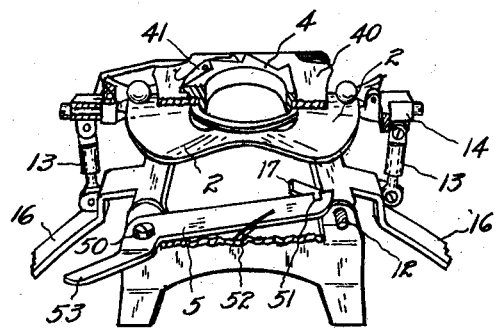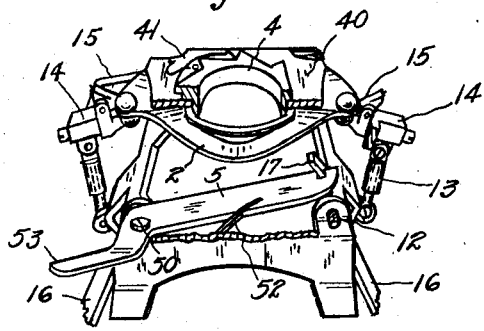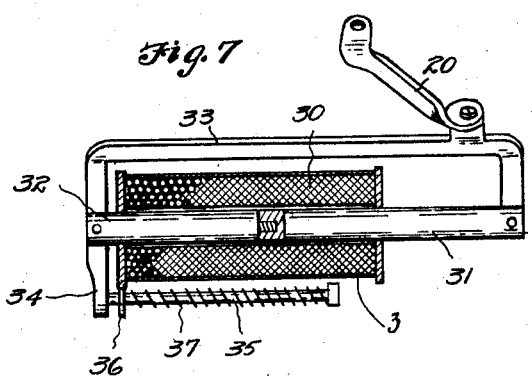

W. A. SCHROEDER.
DIMMING DEVICE FOR HEADLIGHTS.
APPLICATION FILED JULY 14, 1919.
1,389,273.
Patented Aug. 30, 1921.
4 SHEETS—SHEET 4.
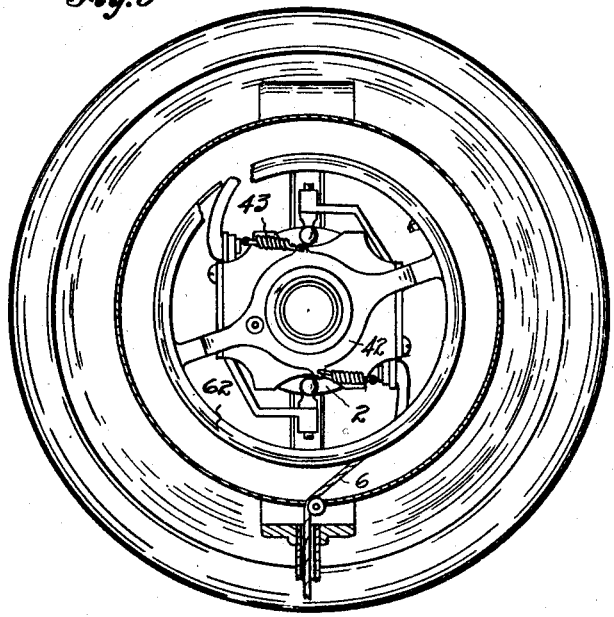
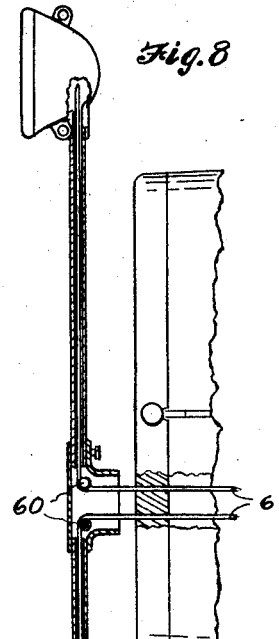
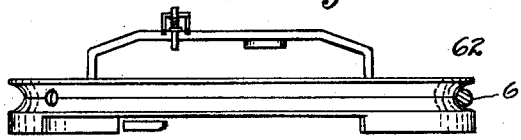
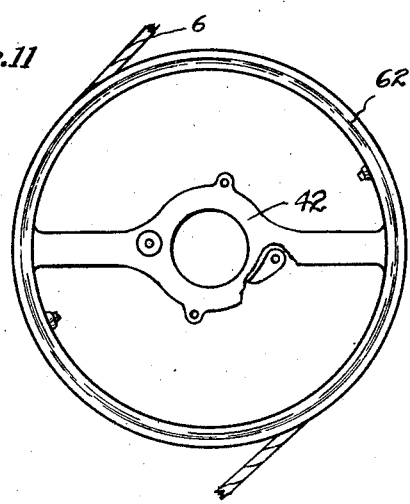
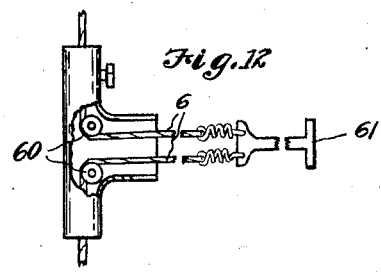
INVENTOR
William A. Schroeder
BY
ATTORNEY

UNITED STATES PATENT OFFICE.

WILLIAM A. SCHROEDER, OF SEATTLE, WASHINGTON.

DIMMING DEVICE FOR HEADLIGHTS.

1,389,273. Specification of Letters Patent. Patented Aug. 30, 1921.

Application filed July 14, 1919. Serial No. 310,824.

*To all whom it may concern:*

Be it known that I, WILLIAM A. SCHROEDER, a citizen of the United States, and resident of the city of Seattle, county of King, State of Washington, have invented certain new and useful Improvements in Dimming Devices for Headlights, of which the following is a specification.

This invention relates to headlights and to the means whereby the headlights may be dimmed or screened when desired.

The object of this invention is to provide a convenient mechanism whereby the rays of light which are projected from a headlight may be screened to a certain extent, so as to eliminate the glare in such a direction as will interfere with the clear vision of any person who is in front of the headlight.

The features of this invention which are new and upon which patent protection is desired will be hereinafter described and then particularly defined in the claims.

The accompanying drawings show this invention in its preferred form of construction.

Figure 1 is a section taken through the headlight showing the mechanism for operating the shields or screens.

Fig. 2 is a section taken in a plane at right angles to the axis of the headlight, and back of the screen operating mechanism.

Fig. 3 is a section taken through the headlight upon an axial plane located at right angle to the plane of the section employed in Fig. 1.

Fig. 4 is a front view of a headlight having my screening plates mounted thereon.

Figs. 5 and 6 are perspectives showing, with portions in section, or broken away, the immediate operating mechanism for the shields.

Fig. 7 is a section taken through one of the solenoids by which the screens are operated.

Fig. 8 is a diagram showing the manner of operating the type of shields employed through the use of mechanical means, as cords.

Fig. 9 is a section taken through the outside casing of the headlight back of the screen operating mechanisms.

Figs. 10 and 11 are, respectively, edge and face views of the pulleys from which the operating cords lead.

Fig. 12 is a detail illustrating the manner of handling the cords for mechanical operation of the device.

The present invention is an improvement upon the operating means for the type of screening device shown in my United States Patent No. 1,305,498, issued June 3, 1919. The type of screening plates and the means for operating the same are, to a considerable extent, the same in the present application as is shown in the said patent. It is to be understood that the construction is the same, except as it is otherwise described and illustrated.

In the aforesaid patent, two screening plates or shields were employed, these being located at the front side of the reflector 10 and mounted so as to swing back and lie substantially in the plane of the reflector, or forwardly, so as to assume approximate parallel relationship with each other at each side of the light 11. The mounting and the swinging action of these plates is the same in the present invention as was shown and described in the said patent. The manner of operating and controlling the position of these screening plates is by the use of a cam in a manner very analogous, but slightly different from that described in the said patent.

The two screening plates 1 are pivoted at points 12. Each of these plates is connected through a link 13 with one end of a lever 14, the other end of which is pivoted, as at 15, so as to swing in a plane toward and from the screening plates. The link 13 is preferably made in two parts, one end-piece being screwed into the other; or in a similar manner is made adjustable in length.

Mounted so as to turn about the axis of the lamp is a cam plate 2. This cam plate is a disk having its edges waved or bent so as to form a cam having a wavy perimeter. The bends in this plate are in a direction normal to its main plane, or its plane of rotation, so that the movement caused thereby is in the direction of the axis of the lamp and of the axis of the cam disk. To one end of the swinging bars 14 are secured two arms 15, which overlap the edges of the cam disk, one at each side thereof. These are separated to such a distance that they permit free turning of the cam disk. It is evident that, if the cam disk be turned, it will cause a movement of the arms 15 back and forth in the direction of the axis of the lamp. This will swing the bars 14 and, the screens 1 being connected therewith through the links 13, will also be caused to swing back and forth.

The means employed for electrically operating the screens consists of two solenoids 3. These solenoids are located one at each side of the axis of the headlight and in a plane which is perpendicular to said axis. In Fig. 7 one of these solenoids is shown in detail. The coil 30 is of ordinary construction. The core is made in two sections 31 and 32. The section 31 is of magnetic material while the section 32 is of non-magnetic material, and, therefore, the current flowing in the coil 30 will have no effect upon the section 32 to cause any movement therein by inductive electrical action. The two sections being, however, secured together, the inductive action upon magnetic section 31 will cause it to enter the coil, which will, of course, carry along the non-magnetic section 32.

The two ends of the cores are connected by a yoke bar 33. This bar also projects laterally to form the arm 34, which arm has secured thereto a rod 35 which passes through an ear 36 carried by the casing of the core, and has thereon a spring 37. When the core 31 is drawn into the coil, the spring 37 will be compressed, and when the current is cut off the spring will act to return the coil to its normal position, or that shown in Fig. 7.

Secured to the cam plate 2 is a ratchet wheel 4. Mounted alongside of, but to turn in relation to this ratchet wheel, is a pawl carrying plate 40. This has a pawl 41 pivoted thereon and adapted to engage the teeth of the ratchet wheel 4. The number of teeth upon the wheel 4 correspond with the number of the convolutions in the edge of the cam plate. In consequence, if the ratchet wheel be advanced one tooth at a time it will shift the cam plate the distance between the extreme positions of adjacent convolutions. This will act to draw the screening plates from closed to open position, or the contrary, as the case may be.

Links 20 are secured by one end to the yoke bar 33 which is connected with the solenoid core. The other end of these links are connected with the pawl plate 40. The length of stroke of the solenoid core is sufficient to cause movement of the pawl plate enough to advance the ratchet wheel one tooth.

The arms 16, which carry the screening plates, are provided with extension fingers 17 and these are engaged by a locking bar 5 which is pivoted at the point 50, and has a notch 51 adapted to engage and embrace the finger 17, when the screening plate has been drawn outward, or into screening position. A spring 52 normally holds the locking bar in holding position until its positive release.

The opposite end of the bar 5 is bent to one side to form an end 53 which is in the path of movement of the yoke bar 33 carried by the solenoid cores. It is in such position as to not be engaged by this yoke bar when the parts are all in their normal position. It is, however, engaged by the yoke bar 33 immediately after its movement has started in the direction caused by the entrance of the core into the coil of the solenoid. The first action caused by the reciprocation of the solenoid core is thus to release the screening plates. A sufficient movement to secure this release is provided for before the pawl 41 engages the teeth of the ratchet wheel 4. The screening plates are thus locked and held in their outward position so that the current need not be maintained upon the solenoid coils during the entire time when the screening plates are in use.

The devices shown in Figs. 8 to 12 inclusive illustrate mechanism by which the parts may be operated through a mechanical instead of an electrical connection. This shows the cords 6 which extend from any convenient position adjacent to the driver, over suitable guides, as the pulleys 60, to the headlights. At the operating end a handle, as 61, is provided by which the same may be operated. Each headlight is provided with a pulley or wheel 62, which is secured to the pawl plate, which pawl plate 42 is somewhat modified in construction. Springs, as 43, act to return the pawl plate to its normal position. It is evident that by a pull exerted upon a core, as 6, the pawl plate may be turned such an amount as may be necessary to secure the turning of the ratchet wheel 4, and the cam disk 2 to shift the screening plates between their two positions.

What I claim as my invention is:

1. A screening device for headlights comprising two screening plates pivoted at opposite sides of the light, said plates being curved and positioned to conform approximately to the curve of the reflector when they are not in screening position, a cam disk mounted to turn about the axis of the headlight, and having its edges forming convolutions, pivoted levers having fingers engaging opposite sides of said cam disk, means connecting said levers with the screening plates, actuating means for said cam disk including a ratchet mechanism for converting a reciprocating movement into an intermittent rotative movement of the cam disk, locking mechanism for the screening plates and means for imparting an initial releasing movement to the locking mechanism and thereafter imparting an operative movement to the cam disk actuating means, substantially as described.

2. A screening device for headlights comprising two screening plates pivoted at opposite sides of the light, said plates being curved and positioned to conform approximately to the curve of the reflector when they are not in screening position, a cam disk mounted to turn about the axis of the headlight, and having its edges forming convolutions, pivoted levers having fingers engaging opposite sides of said cam disk, means connecting said levers with the screening plates, actuating means for said cam disk including a ratchet mechanism for turning said cam disk, and a solenoid having an actuating connection with said ratchet mechanism, and locking means having actuating connection with the solenoid whereby the locking means are unlocked by the initial movement of the solenoid, substantially as described.

3. A screening device for headlights comprising two pivoted screening plates and screen controlling mechanism comprising a cam disk mounted to turn about the axis of the headlight, a ratchet wheel secured to the said cam disk, a pawl plate mounted to turn about the same axis and carrying a pawl adapted to actuate the ratchet wheel, a solenoid placed with its axis parallel with the plane of the pawl plate, the solenoid armature having a laterally projecting arm and a link connecting said arm with the pawl plate, a spring pressed locking plate adapted when in locking position to prevent pivotal movement of the screening plates and adapted to be released from locking position by an initiatory contact of the arm carried by the solenoid armature, substantially as described.

Signed at Seattle, Washington, this 7th day of July, 1919.

WILLIAM A. SCHROEDER.